Dec. 2, 1969          B. I. ROUTH          3,482,007

METHOD FOR LINING A PIPE

Filed April 22, 1966          2 Sheets-Sheet 1

INVENTOR.
Benjamin I. Routh
BY William S. Dorman
ATTORNEY

Dec. 2, 1969  B. I. ROUTH  3,482,007

METHOD FOR LINING A PIPE

Filed April 22, 1966  2 Sheets-Sheet 2

INVENTOR.
Benjamin I. Routh
BY
William S. Dorman
ATTORNEY

United States Patent Office 3,482,007
Patented Dec. 2, 1969

3,482,007
METHOD FOR LINING A PIPE
Benjamin I. Routh, Great Bend, Kans., assignor to Rice Engineering & Operating, Inc., Great Bend, Kans., a corporation of Kansas
Filed Apr. 22, 1966, Ser. No. 544,623
Int. Cl. B28b 21/72, 21/16
U.S. Cl. 264—71         6 Claims

ABSTRACT OF THE DISCLOSURE

A method and apparatus for lining a pipe which involves selecting a relatively thin plastic tube whose external diameter is somewhat less than the internal diameter of the bore of the pipe, cleaning the pipe to be lined, roughening the outside surface of the plastic tube liner, flaring one end of the liner and machining the flared end to size, inserting the liner into the pipe to be lined from the coupling end of the pipe, attaching special heads to each end of the pipe so as to seal the liner with respect to the pipe and also to support the liner in such a manner that there is an annular space between the outside of the liner and the inside of the pipe, inclining the pipe so that the coupling end is higher than the pin end of the pipe, mixing a cement slurry, pumping the cement slurry into the annular space between the pipe to be lined and the liner, vibrating the pipe and liner assembly by pumping in the cement slurry, placing a pressure squeeze on the cement slurry at both ends of the pipe to effect a seal, removing the special heads from both ends, allowing the cement to cure, cleaning any excess cement from the pin end of the pipe and liner, and flaring the other end of the liner.

---

The present invention relates to a method for lining a pipe and, more particularly, to a method for lining a pipe with a thin layer of plastic material.

The advantages of lining a pipe with plastic or similar material are well recognized particularly where the liquid or fluid would be otherwise corrosive to the pipe itself. In this regard, it should be mentioned that there are many different methods and techniques for lining a pipe with plastic or similar material using various coating methods and apparatus, using various arrangements of thermo plastic tubes, thermo setting compounds and cements; the various methods and apparatus of the prior art are so manifold and diverse that further enumeration is deemed unnecessary.

The present invention, briefly stated, relates to the lining of an elongated pipe section having a pin end with external threads thereon and an enlarged coupling end with internal threads thereon; it should be understood that the internal threads of the coupling end are adapted to mate with the external threads on the pin end of another pipe section of the same diameter and size as the first-mentioned pipe section. The method and apparatus of the present invention includes the supporting of a relatively thin plastic tube within the internal bore of the pipe section in substantially concentric relation with the bore of the pipe. The external diameter of the tube is less than the internal diameter of the bore of the pipe section such that an annular space is formed between the tube and the pipe section. The means for supporting the plastic tube in this concentric relationship include head members engageable with the pin end and coupling end respectively. Each head is provided with a port communicating with the annular space and with the atmosphere. Each head also includes a sealing means for closing the annular space adjacent the ends of the pipe. Means are provided to support the assembly of pipe and tube in an inclined position. Means are provided for introducing a cement slurry into the annular space. Finally, means are provided to vibrate the support during the time that the annular space is being filled with cement slurry.

The method and apparatus of the present invention is set forth in greater detail, as will appear hereinafter, in terms of the sizes and shapes of the heads which mate with the pin end and coupling end respectively of the pipe section. For example, the head for the pin end is provided with internal threads and with a hole substantially equal in diameter to the outer diameter of the plastic tube; this last mentioned head is also provided with an O-ring which bears arainst the outer surface of the plastic tube so as to seal the annular space at that end of the pipe section. The head which engages the coupling end of the pipe section is provided with external threads which mate with internal threads at the coupling end; the latter head is also provided with an annular shoulder surrounding an inner portion of reduced diameter. The portion of reduced diameter is substantially equal to the inner diameter of the plastic tube and is provided with an O-ring which seals against the inner surface of the tube thereby closing the annular space at the coupling end of the pipe section. Preferably, the plastic tube is flared at the coupling end of the pipe section as this flare will rest against the shoulder mentioned above.

Further details of the invention will appear hereinafter.

Therefore, it is the principal object of the present invention to provide a method for lining a pipe with plastic material in a manner which is superior to the corresponding teachings of the prior art.

It is a further object of the present invention to provide a method for lining a pipe as set forth herein which involves positioning a plastic tube within the internal bore of the pipe and in concentric relation therewith, said tube having an outer diameter less than the inner diameter of the pipe so as to form a resulting annular space, sealing the ends of the annular space and thereafter introducing a cement slurry into the annular space, the outer ends of the plastic tube being flared outwardly after the cement slurry has hardened.

It is a still further object of the present invention to provide a method for lining a pipe as set forth above wherein the assembly of pipe and tube is inclined during the time that the cement slurry is being introduced, the cement slurry being introduced through a port adjacent the bottom of the incline.

It is another object of the present invention to provide a method and apparatus for lining a pipe as set forth above wherein a second port is provided at the upper end of the incline communicating with the annular space and the atmosphere.

It is yet another object of the present invention to provide a method and apparatus for lining a pipe as set forth above wherein a screen is mounted in the upper port covering the cross-sectional area thereof.

It is another object of the present invention to provide a method and apparatus for lining a pipe as set forth above wherein the pipe and tube assembly is vibrated during the time that the cement slurry is being introduced into the annular space.

Other and further objects and advantageous features of the present invention will hereinafter more fully appear in connection with the detailed description of the drawings in which.

Figure 1:
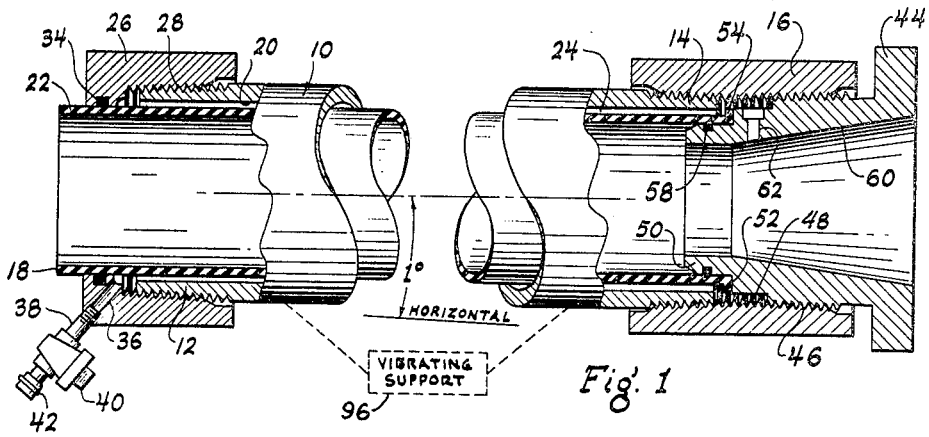
FIGURE 1 is a partial sectional view of a pipe section showing the plastic tube mounted therein and held in position by the heads connected to the end of the pipe section; the pipe section and tube are broken midway between their ends so that the details of the ends can be shown.

Referring to the drawings in detail, FIGURE 1 shows a pipe section generally designated by the reference numeral 10. One end of the pipe section is provided with external and tapered threads 12; this end of the pipe section will hereinafter be referred to as the pin end. The other end of the pipe section is similarly tapered at 14; however this is connected to a coupling member 16 which is snugly secured to the threads 14 and is generally "permanently" associated with the pipe section 10. The end of the pipe section having the coupling member 16 mounted thereon will be hereinafter referred to as the coupling end of the pipe section. An elongated plastic tube 18 is mounted within the pipe section 10 as shown. The pipe section 10 has an internal bore 20 which is of uniform diameter throughout the length of the pipe section (except for the enlarged opening in the coupling 16). The plastic tube 18 has an external diameter 22 which is smaller than the diameter of the bore 20 so as to provide an annular space 24 between the pipe section 10 and the tube 22.

At the left hand or pin end of the pipe section 10 there is mounted a head 26 (see also FIGURE 4) having internal threads 28 which mate with the threads 12. The head 26 is also provided with a circular opening 30 of reduced size and having a diameter substantially equal to the outer diameter 22 of the plastic tube 18. Within the hole 30 there is provided an annular recess 32 for receiving therein an O-ring 34. The relationship between the opening 32, the O-ring 34 and the outer diameter 22 of the plastic tube 18 is such that the left hand end of the annular space 24 is closed at the pin end of the pipe section. However the head 26 is provided with an inclined port 36 communicating at its outer end with the atmosphere and at its inner end with the annular space 24. The outer end of the port 36 can be connected to fitting 38 including a cut-off valve 40 and quick-disconnect coupler 42 for purposes which will hereinafter appear.

Figure 5:
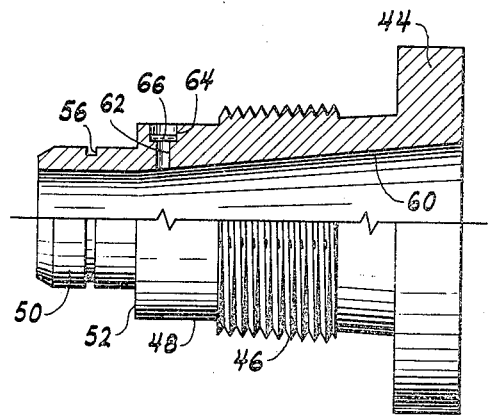
FIGURE 5 is a partial sectional view showing the details of a head to be used in association with the coupling end of the pipe section.

A second head 44 (see also FIGURE 5) is mounted at the right hand or coupling end of the pipe section 10. The head 44 is provided with external threads 46 on one portion thereof which mate with the threads 14 on the coupling 16. The head 44 is also provided with a first circumferential portion 48 of reduced diameter with respect to the threaded portion 46. The head 44 is also provided with a second circumferential portion 50 of reduced diameter with respect to the first circumferential portion 48. The first and second circumferential portions, 48 and 50, respectively, are joined by a radial shoulder 52. The right hand end of the plastic tube 18 is flared outwardly at 54 and is received over the circumferential portion 50 with the flare 54 abutting against the shoulder 52. The circumferential portion 50 is provided with an annular recess 56 which is adapted to hold another O-ring 58. The external diameter of the circumferential portion 50 is substantially equal to the internal diameter of the plastic tube 18. The relationship between the internal diameter of the plastic tube 18, the O-ring 58, the head 44 and the coupling 16 is such as to provide a seal or closure for the right hand or coupling end of the annular space 24.

The head 44 is provided with an internal bore 60 which communicates with the interior of the above described assembly. The circumferential portion 48 is provided with a port 62 which communicates at its upper end with the annular space 24 and at its lower end with the atmosphere (through the bore 60). The upper end of the port 62 may be provided with an enlarged portion 64 in which a screen 66 can be mounted.

Figure 4:
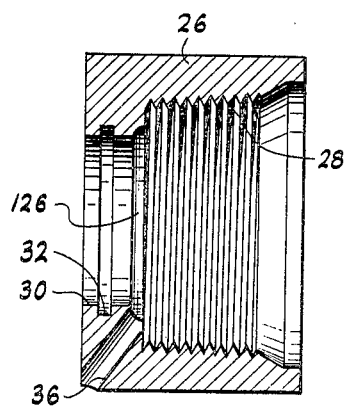
FIGURE 4 is a sectional view showing one embodiment of head to be employed at the pin end of the pipe section.
Figure 6:
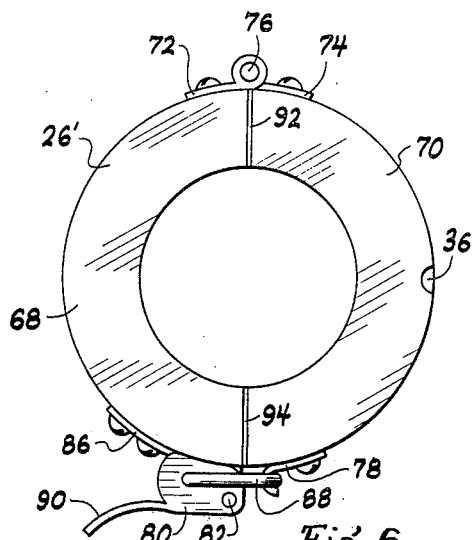
FIGURE 6 is an end elevation of a modified form of the head shown in FIGURE 4.
Figure 7:
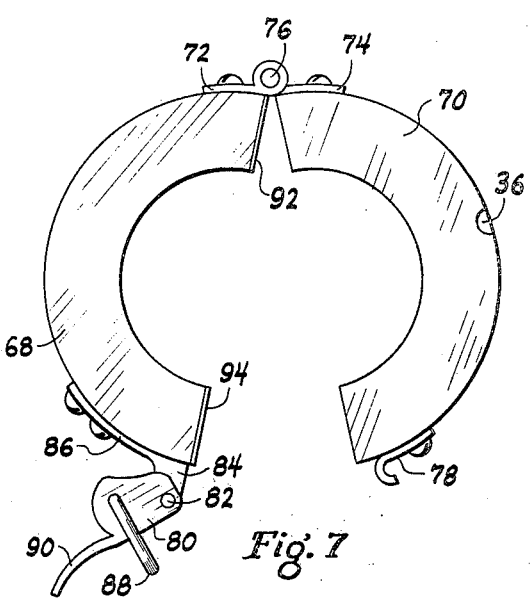
FIGURE 7 is a view similar to FIGURE 6 showing the parts in their open position.

FIGURES 6 and 7 show a modified form of the head 26 shown in FIGURE 4. In these figures the head 26' is split, in effect, by a plane passing through the longitudinal center line of the head so as to form a left hand section 68 and a right hand section 70 connected by means of hinge sections 72 and 74 and pin 76. The hinge sections 72 and 74 are connected to the head portions 68 and 70, respectively, by means of bolts or any other suitable means. The lower end of head section 70 is provided with a hook member 78 which is secured to the head section by any convenient means. The lower end of head section 68 is provided with an arm 80 which is pivotally mounted at 82 on an ear 84. The ear 84 is part of a strap 86 which is connected to the head section 68 by any convenient means. A link or loop 88 is pivotally mounted on the arm 80 to the left of the pivot connection 82. The right hand end of the link 88 is adapted to engage the hook 78 so as to hold the head sections 68 and 70 together as shown in FIGURE 6 when the arm 80 is pivoted to its extreme clockwise position. The arm 80 is provided with a small handle 90 to permit the opening and closing of the resulting latch just described above. In order to provide an effective seal between the mating surfaces of the head sections 68 and 70 rubber gasket members 92 and 94 are connected to the head section 68 so as to be disposed between the mating surfaces when the head sections are closed as shown in FIGURE 6.

For the purpose of providing a detailed description of the method and apparatus of the present invention a specific example will now be given. However it should be understood that this specific example is offered primarily for illustration purposes and should not be considered as limiting with respect to the scope of the invention.

EXAMPLE

In this instance the pipe section 10 to be lined should be considered as a string of 2⅜" O.D. external upset, 4.60#, seamless, 8 round thread tubing. This is a common tubing used in the oil production industry. Thus this string of tubing (or pipe section) can be more precisely considered as a steel pipe having 2.375" O.D. with an I.D. of 1.995", thereby resulting in a wall thickness of .190". The plastic tube 18 is a polyvinyl chloride (PVC) liner (Class 160) having an O.D. of 1.900" and an I.D. of 1.754", thereby resulting in a wall thickness of .073" (73 mils).

From the above it would appear that there will be a clearance of .0475" (47½ mils) between the two pipes thereby defining the annular space 24.

Although ranges of steel tubing vary considerably, it was decided to use Range 2 tubing which by API standards runs from 28' to 32' in length. With this variation, it is possible to use a standard 32' length of PVC liner. This gives a variation in the amount of PVC liner that must be cut off from 0 to 4'.

In order to provide flare 54 on the end of the PVC liner, a thermostatically controlled electric heater is used. The thermostat is set to maintain a temperature of 280° F. The end is flared oversize and then cut with a hole saw to an O.W. of 2.35".

The special heads 26 and 44 are made of cold rolled steel, are shaped substantially as shown in the drawings and are dimensioned consistent with the above dimensions.

The O-rings are made of rubber. The screen 66 in the outlet port 62 is a 60-mesh screen.

The basic steps in the process are as follows:

(1) Clean the pipe to be lined.
(2) Roughen the outside surface of the liner.
(3) Flare one end of the liner and machine the flared end to size.
(4) Insert the liner into the pipe to be lined from the coupling end.
(5) Attach the special heads to each end of the pipe to be lined with seals against the liner.
(6) Incline the pipe so the coupling end is higher than the pin end.
(7) Mix the cement slurry.
(8) Pump the cement slurry into the annular space between the pipe to be lined and the liner.
(9) Vibrate the pipe and liner assembly while pumping in the cement slurry.
(10) Place a pressure squeeze on the cement slurry at both ends of the pipe to effect a seal.
(11) Remove the special heads from both ends.
(12) Allow the cement to cure.
(13) Clean any excess cement from the pin end of the pipe and liner and flare the liner.

The pipe section to be lined is cleaned internally to facilitate proper placement of the liner. The ends of the pipe are cleaned to facilitate the attachment of the special heads used in the process. It is expected that steel pipe will be used normally; however the present process can be applied to concrete, asbestos-cement, plastic or any other kind of pipe in which case the cleaning methods would be modified consistent with the material employed.

The outside surface of the liner is roughened in order to obtain an improved bond between the cement and the liner. The roughened surface is readily obtained by sandblasting, but other acceptable methods can be employed.

As indicated above one end of the liner 18 is flared by heating the plastic until it becomes pliable; it is then formed to the flared shape desired and cooled. The unflared end of the tube 18 is introduced into the coupling end of the pipe section 10 and advanced into the pipe section until the flare 54 is just outside the collar 16. The liner 18 must be of sufficient length to extend entirely through the pipe section. The special heads 26 and 44 may now be attached. The head 44 is attached first by inserting the circumferential portion 50 into the open end of the tube 18. The head 44 is now screwed into the coupling such that the flare 54 abuts against the shoulder 52.

The head 26 is now screwed into position on the pin end of the pipe section 10 with the unflared end of the tube 18 protruding outwardly from the hole 30 in the head as shown in FIGURE 1. If any great excess of liner extends outwardly from the hole in the head 26, this excess is cut off to leave approximately the amount shown in FIGURE 1.

The pipe and liner assembly is now inclined so that the coupling end 16 is slightly higher than the pin end 12. This will permit a complete displacement of all air from the annular space 24 as the cement slurry is pumped in from the pin end. The inclination is approximately 1° or 5″ in 30′.

Figure 2:
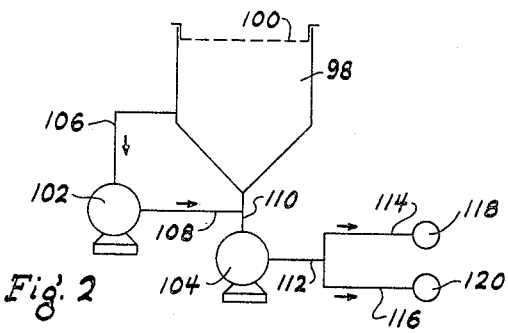
FIGURE 2 is a semi-diagrammatic representation of an apparatus employed for mixing and distributing the cement slurry.

In the meantime the cement slurry is mixed in the equipment diagrammatically shown in FIGURE 2. This equipment consists essentially of a hopper 98 covered by a removable screen 100 and two pumps 102 and 104 driven by a motor or motors (not shown). The pump 102 is the recirculating pump and the pump 104 is the filling or supply pump for supplying the cement slurry to the annular space 24. By way of information (and not by way of limitation) the two pumps used in this example are of the Moyno progressing cavity type which will handle viscous, high-solids fluid without a high degree of turbulence. These pumps have a positive displacement but do not produce pulsation. The inlet to the pump 102 connects with the hopper 98 through the conduit 106. The outlet of the recirculating pump 102 connects back to the hopper 98 through the conduit 108. The inlet to the supply pump 104 connects with the outlet 108 from the pump 102 through the conduit 110. The outlet conduit 110 connects to one or more flexible hoses 114 and 116 which are provided with valves 118 and 120 connecting at the outer ends of these hoses respectively. The conduit 114 (or 116) is adapted to connect with the inlet conduit 36 of the head 26 by means of the quick-disconnect coupler 42. Thus when the valves 40 and 118 are open the supply pump 104 is capable of introducing cement slurry into the annular space 24 through the conduit 36.

A specific mixture of cement slurry which is used in this example is as follows:

5 lb. Hi-Early portland cement (Type III)
2 lb. fly ash (pozzolanic material)
½ lb. bentonite (montmorillonite material)
5 lb. fresh water
1% calcium chloride (accelerating agent)

The recirculating pump 102 is run at a speed to deliver approximately two gallons per minute of slurry. The outlet of this pump is just above the inlet of the supply pump 104 such that a well mixed, creamy cement slurry is delivered to the supply pump at all times. The supply pump is run at a speed that will fill the annular space 24 in approximately 80 seconds. The initial pump pressure from the supply pump 104 is approximately 15 p.s.i. and gradually builds up to approximately 40 p.s.i. as the annular space fills. It should be noted that the head 26 is provided with a groove 126 adjacent the entrance to the annular space 24 so that the cement slurry can enter uniformly and with a minimum of resistance. It should be mentioned also that the pipe and tube assembly is arranged such that the port 36 on the head 26 is downwardly directed at the lower end of the incline and the port 62 on the head 44 is upwardly oriented at the upper end of the incline. Therefore, as the annular space fills with cement slurry, the air is vented through the port 62. The pressure rises rapidly once the annulus 24 is full. When the pump pressure from the supply pump 104 builds up to approximately 65 p.s.i. the valves 40 and 118 are closed, the hose 114 is removed from the disconnect coupler 42 and the slurry can be diverted to the next pipe to be similarly treated.

During the time that the annulus 24 is being filled with cement slurry the assembly is vibrated. Both the vibrator and the pipe support are designated by the reference numeral 96. However the assembly can be supported by two or more individual supports as desired. The vibrator is therefore attached to one of the supports. The vibrator which was used in this example consists of a floating support mounted on springs; a countershaft with an unbalanced shaft is rotated at 1725 r.p.m. by a belted electric motor (not shown). Whether the support and vibrating means 96 shown in FIGURE 1 is considered as two separate means or as a single device is immaterial to the considerations of the present invention.

Returning again to the filling operation, a slight increase in pressure will indicate when the annular space is filled with cement slurry. Thereafter it is preferable to place a pressure squeeze on the slurry to seal both ends. This is accomplished by forming a "bridge" or plug of the solid particles in the slurry at each end of the pipe and by squeezing the water out of the "bridge" with pressure. As water is squeezed out, additional solids build up and the "bridge" mass becomes quite firm. In order to effect the "bridge" at the coupling end, the port 62 is fitted with a screen 66 which will pass air and water but which will become "bridged" or blocked by the solid particles in the cement slurry. A screened port (not shown) may also be provided in the head 26; however it has been discovered that a good "bridge" is effected at this end by making a loose fit between the head 26 and the pipe 10 when fitting this head on the pipe. By a "loose fit" is meant a fit that will not hold water thereby permitting water to be squeezed out of the cement and permitting a build up of solids. It is at this point that the valves 40 and 118 are closed and the hose 114 disconnected from the connection 42.

After disconnecting the hose 114, the above assembly is allowed to stand for about thirty minutes. The heads are then removed. Although the coupling head 44 can be removed substantially immediately without any difficulty or danger to the product because the liner is firmly held in place by the flare 54, the removal of the head 26 is a more difficult operation in that the liner protruding through this head is unsupported except for the cement bridge which can be destroyed by excessive movement. By having a plurality of heads 26, movement of the specific head 26 can be delayed until the cement is partially set. The setting time can be shortened by an increase in temperature, the use of a high early-strength type portland cement, and/or the use of an accelerating agent; the latter accelerating methods may be used individually or in any combination.

The split and hinged head 26' shown in FIGURES 6 and 7, and as described previously, may be used for the purpose of facilitating the removal of the head at the pin end while minimizing the danger of destroying the cement bridge at that end. Preferably this head 26' is screwed on with a "loose fit" as described above with the latch in the closed position shown in FIGURE 6. At the time of removal the latch can be opened to the position shown in FIGURE 7 and the head 26' simply removed.

At the end of 2 hours (after the hose 114 is disconnected) the excess cement is removed; after 4 hours the liner at the pin end is flared and machined in a manner similar to the coupling end flaring operation previously described.

The foregoing example has been set forth in considerable detail so that the man skilled in this art will be fully apprised of one complete and specific embodiment of the present invention. However it should be obvious that this invention is not limited to the specific details set forth above. The above process has been described in particular relation to a "threaded and coupled" type of pipe; obviously the present method and apparatus can be adapted to pipe of the grooved end type or the welded joint type. The particular type of liner is not critical to the present invention; although the plastic tube 18 has been described as PVC, any other material having similar properties can be employed; it suffices if the plastic liner employed is capable of being flared in a manner similar to that described herein.

Based upon the above example it will appear that this invention employs a neat cement made from cement slurry consisting essentially of:

10 parts by weight of portland cement,
4 parts by weight of fly ash,
1 part by weight of bentonite,
10 parts by weight of water,
1 percent (of above total) of calcium chloride.

However, although the proportions of portland cement and water generally remain constant, it is possible to vary the amount of fly ash from 2 to 6 parts by weight, the amount of bentonite between ½ and 1½ parts by weight; the calcium chloride, which acts as an accelerator, can be omitted if desired or can be used in amounts up to 3% of the total weight. Thus the broad ranges of the cement slurry can be set forth in terms of:

10 parts by weight of portland cement,
2 to 6 parts by weight of fly ash,
½ to 1½ parts by weight of bentonite,
10 parts by weight of water,
0 to 3% (of above total) of calcium chloride.

The above ingredients are preferably mixed in a conventional cement mixer (not shown) and then transferred to the hopper 98.

Figure 3:
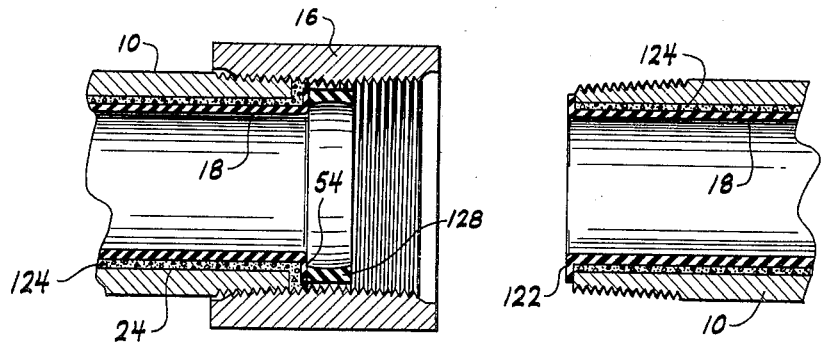
FIGURE 3 is a fragmentary sectional view showing the intermating relationship between the adjacent end of two pipe sections which are constructed in accordance with the present invention.

FIGURE 3 shows the mating ends of two pipe sections lined in accordance with the present invention. The cement lining which was introduced into the annular space 24 and which is now hardened and cured is designated by the reference numeral 124. The left hand end of the liner 18 has been flared and machined to produce the flare 122 in substantially the same manner as has been described above in connection with the flare 54. When inserting the pin end of the right hand pipe section 10 into the coupling end of the left hand pipe section 10 it is desirable to include an annular sealing gasket 128 which can be similar to that shown in Routh Patent No. 2,805,872 issued Sept. 10, 1957 and entitled "Lined Pipe Coupling With Internally Flush Gasket."

In the event that the pipe section 10 is provided with two pin ends 12 (the coupling 16 having been removed or being removable), then two heads such as the head 26 are employed. However, one port 36 will be downwardly directed at the lower end of the incline and the other port 36 will be upwardly directed at the upper end of the incline. Heads similar to heads 26 and 44 can be employed in modified form, for use in conjunction with other types of pipe sections. The head 44 is described as having a hollow bore 60; naturally the head 44 could be a solid plug, if desired; however, the port 62 must communicate to the atmosphere in some manner through the head 44. The threads in the coupling 16 are preferably tapered into the center from both ends such that the center of the coupling has the smallest inside diameter of any part of the coupling.

Whereas the present invention has been described in particular relation to the drawings attached hereto and the specific example set forth herein it should be understood that other and further modifications, apart from those shown or suggested herein, may be made within the spirit and scope of this invention.

What is claimed is:

1. A method of lining a pipe having a longitudinally extending hole of a pre-determined diameter with plastic material which includes the steps of inserting into the hole of said pipe a thin plastic tube having an external diameter smaller than said pre-determined diameter of said hole, supporting said plastic tube within said pipe so as to form an elongated annular space between the outside of said plastic tube and said pipe, sealing the ends of said plastic tube with respect to the ends of said pipe while providing a lower inlet at one end and an upper outlet at the other end communicating with said annular space, tilting the assembly of pipe and tube such that the lower inlet is at the lower end of the resulting incline and the upper outlet is at the upper end of said resulting incline, and introducing a cement slurry into said lower inlet until said annular space is filled with said cement slurry, said assembly being vibrated during the time that said annular space is being filled with said cement slurry.

2. The method of lining pipe as set forth in claim 1 wherein said cement slurry consists essentially of:

10 parts by weight of portland cement,
4 parts by weight of fly ash,
1 part by weight of bentonite,
10 parts by weight of water,
1 percent (of above total) of calcium chloride.

3. A method of lining a pipe of a pre-determined length and having a hole of a pre-determined internal diameter which comprises flaring one end of a thin plastic tube having an outer diameter less than the diameter of said hole and a length greater than the length of said pipe, said flare being slightly larger in external diameter than the diameter of said hole, inserting said thin plastic tube into said hole of said pipe until the unflared end projects outwardly from one end of said pipe and said flared end is spaced slightly outwardly away from the other end of said pipe, the outer surface of said plastic tube being roughened and forming an annular space with said hole, sealing the ends of said tube with respect to the ends of said pipe such that said annular space is closed except for a lower inlet port at one end of the annular space and an upper outlet port at the other end of said annular space, tilting said pipe and tube assembly such that said lower inlet is at the lower end of said resulting incline and the upper outlet port is at the upper end of said resulting incline, introducing cement slurry under pressure into said inlet port until said annular space is filled with said cement slurry, vibrating said assembly while said annular space is being filled with said cement slurry, removing the sealing means at the opposite ends of said pipe after said cement slurry is hardened, removing excess cement at the ends of said pipe, and flaring the unflared end of said plastic tube outwardly.

4. The method of lining pipe as set forth in claim 3 wherein said cement slurry consists essentially of:

10 parts by weight of portland cement,
4 parts by weight of fly ash,
1 part by weight of bentonite,
10 parts by weight of water,
1 percent (of above total) of calcium chloride.

5. The method of lining pipe as set forth in claim 1 wherein said cement slurry consists essentially of:

10 parts by weight of portland cement,
2 to 6 parts by weight of fly ash,
½ to 1½ parts by weight of bentonite,
10 parts by weight of water,
0 to 3% (of above total) of calcium chloride.

6. The method of lining pipe as set forth in claim 3 wherein said cement slurry consists essentially of:

10 parts by weight of portland cement,
2 to 6 parts by weight of fly ash,
½ to 1½ parts by weight of bentonite,
10 parts by weight of water,
0 to 3% (of above total) of calcium chloride.

References Cited

UNITED STATES PATENTS 3,125,124   3/1964   Daniels _____ 264—269

FOREIGN PATENTS 1,228,439   8/1960   France.

ROBERT F. WHITE, Primary Examiner
R. SHEAR, Assistant Examiner

U.S. Cl. X.R.

25—38; 264—262, 269